(12) United States Patent
Park et al.

(10) Patent No.: US 11,289,220 B2
(45) Date of Patent: Mar. 29, 2022

(54) PASSIVE REACTOR CAVITY COOLING SYSTEM

(71) Applicant: KOREA ATOMIC ENERGY RESEARCH INSTITUTE, Daejeon (KR)

(72) Inventors: Byungha Park, Sejong-si (KR); Hongsik Lim, Daejeon (KR); Eungseon Kim, Seoul (KR); Changkeun Jo, Daejeon (KR); Minhwan Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 382 days.

(21) Appl. No.: 16/289,906

(22) Filed: Mar. 1, 2019

(65) Prior Publication Data

US 2020/0027596 A1  Jan. 23, 2020

(30) Foreign Application Priority Data

Mar. 9, 2018  (KR) .................. 10-2018-0028202

(51) Int. Cl.
*G21C 15/26*  (2006.01)
*G21C 15/28*  (2006.01)
(Continued)

(52) U.S. Cl.
CPC ............. *G21C 15/26* (2013.01); *G21C 5/123* (2013.01); *G21C 15/20* (2013.01); *G21C 15/28* (2013.01)

(58) Field of Classification Search
CPC ........ G21C 15/02; G21C 15/18; G21C 15/20; G21C 15/26
See application file for complete search history.

(56) References Cited

U.S. PATENT DOCUMENTS 5,339,340 A * 8/1994 Hunsbedt ............... G21C 15/18
376/299
2012/0099974 A1* 4/2012 Wolf ....................... F01K 9/003
415/178
(Continued)

FOREIGN PATENT DOCUMENTS

JP  03170899 A * 7/1991
JP  2013-104711 A  5/2013
(Continued)

OTHER PUBLICATIONS

Conklin, J C. Modeling and performance of the MHTGR (Modular High-Temperature Gas-Cooled Reactor) reactor cavity cooling system. United States: N. p., 1990. Web. doi: 10.2172/7013277. (Year: 1990).*

(Continued)

*Primary Examiner* — Jack W Keith
*Assistant Examiner* — Joshua C Devorkin
(74) *Attorney, Agent, or Firm* — Scully, Scott, Murphy & Presser, P.C.

(57) ABSTRACT

A passive reactor cavity cooling system according to the present invention includes: a reactor cavity formed between a reactor vessel and a containment structure enclosing the reactor vessel; a first cooling system to control external air to sequentially pass through an air falling pipe and an air rising pipe provided in the reactor cavity, so that residual heat of a core transferred to the reactor cavity is discharged to the atmosphere; a second cooling system having a water cooling pipe disposed in an inner space of the containment structure or in a wall of the containment structure to discharge the residual heat of the core transferred to the reactor cavity to outside; and a functional conductor having an insulating property in a normal operation temperature range of the reactor and a heat transfer property in an accident occurrence temperature range of the reactor which is a (Continued)

higher temperature environment than the normal operation temperature range, wherein the air falling pipe and the water cooling pipe are disposed behind the air rising pipe with respect to a direction viewed from the reactor vessel, and the functional conductor is disposed between the air falling pipe and the air rising pipe.

16 Claims, 9 Drawing Sheets

(51) Int. Cl.
*G21C 5/12* (2006.01)
*G21C 15/20* (2006.01)

(56) References Cited

U.S. PATENT DOCUMENTS

| | | | | |
|---|---|---|---|---|
| 2015/0124922 | A1* | 5/2015 | Peterson | G21C 15/12 376/347 |
| 2017/0133112 | A1* | 5/2017 | Singh | G21C 7/32 |

FOREIGN PATENT DOCUMENTS

| | | | | |
|---|---|---|---|---|
| KR | 20070086479 | A | | 8/2007 |
| KR | 20090021722 | A * | 3/2009 | ............ Y02E 30/33 |
| KR | 1020090021722 | A | | 3/2009 |
| KR | 100906717 | B1 | | 7/2009 |
| KR | 10-2012-0132493 | A | | 12/2012 |
| KR | 20140031796 | A | | 3/2014 |
| KR | 10-1498587 | B1 | | 3/2015 |
| KR | 101498587 | B1 * | 3/2015 | ............ G21C 15/26 |
| KR | 20150097378 | A | | 8/2015 |
| KR | 20150108999 | A | | 10/2015 |
| KR | 101628170 | B1 | | 6/2016 |
| WO | WO-2017098227 | A1 * | 6/2017 | ........... G21C 11/088 |

OTHER PUBLICATIONS

Notice of Reasons for Refusal dated Feb. 4, 2020 received in Japanese Patent Application No. JP 2019-040637 together with an English language translation.

* cited by examiner

PASSIVE REACTOR CAVITY COOLING SYSTEM

CROSS REFERENCE TO RELATED APPLICATIONS

Pursuant to 35 U.S.C. § 119(a), this application claims the benefit of earlier filing date and right of priority to Korean Application No. 10-2018-0028202, filed on Mar. 9, 2018, the contents of which is incorporated by reference herein in its entirety.

BACKGROUND OF THE DISCLOSURE

1. Field of the Disclosure

The present invention relates to an apparatus for passively removing residual heat of a core transferred to a reactor cavity.

2. Description of the Related Art

In the related art air/water hybrid passive reactor for removing residual heat of a core, cooling is performed simultaneously by air and water. An example of an air/water hybrid passive reactor is disclosed in Korean Patent Laid-Open Publication No. 10-2009-0021722 (Mar. 4, 2009).

The air/water hybrid passive reactor disclosed in the above Patent Document is designed on the premise that cooling by air and cooling by water are performed simultaneously in a normal operation state. Here, air cooling means cooling using air as a heat transfer fluid, and water cooling means cooling using water as a heat transfer fluid. Therefore, in case of an accident occurred, if either air cooling or water cooling does not work properly, there is a problem in removing residual heat of a core.

In considering the accident, doubling a design capacity of each of air cooling and water cooling may not cause any problem in removing the residual heat of the core, even if one of the two cooling operations is erroneously carried out upon an occurrence of an accident. However, doubling the design capacity of both air cooling and water cooling increases even a heat loss naturally during a normal operation of the reactor, which lowers overall efficiency of a power plant.

Further, in the air/water hybrid passive reactor disclosed in the above Patent Document, an insulating material is located behind a high-temperature rising pipe. Therefore, there is also a problem that it is impossible to remove the residual heat of the core due to the insulating material interrupting heat conduction to a concrete structure and an external soil upon an occurrence of an extreme accident in which air cooling and water cooling cannot be carried out.

SUMMARY OF THE INVENTION

One aspect of the present invention is to propose a passive reactor cavity cooling system, capable of effectively removing residual heat of a core by using natural circulation without lowering thermal efficiency of an entire reactor.

Another aspect of the present invention is to provide a configuration, capable of improving safety of an entire reactor using multiple barriers through air cooling and water cooling.

Still another aspect of the present invention is to provide a passive reactor cavity cooling system, capable of performing air cooling in a passive manner during a normal operation of a reactor, performing water cooling in a passive manner upon an occurrence of an accident by which air cooling cannot be carried out, and performing cooling using a containment structure and soil upon an extreme accident by which both air cooling and water cooling cannot be carried out.

Still another aspect of the present invention is to provide a passive reactor cavity cooling system having a structure with improved stability by use of a functional conductor.

In order to achieve the above aspects and other advantages of the present invention, there is provided a passive reactor cavity cooling system, including a reactor cavity formed between a reactor vessel and a containment structure enclosing the reactor vessel, a first cooling system to control external air to sequentially pass through an air falling pipe and an air rising pipe provided in the reactor cavity, so that residual heat of a core transferred to the reactor cavity is discharged to the atmosphere, a second cooling system having a water cooling pipe disposed in an inner space of the containment structure or in a wall of the containment structure to discharge the residual heat of the core transferred to the reactor cavity to outside, and a functional conductor having an insulating property in a normal operation temperature range of the reactor and a heat transfer property in an accident occurrence temperature range of the reactor which is a higher temperature environment than the normal operation temperature range, wherein the air falling pipe and the water cooling pipe are disposed behind the air rising pipe with respect to a direction viewed from the reactor vessel, and the functional conductor is disposed between the air falling pipe and the air rising pipe.

According to one embodiment of the present invention, the functional conductor may have effective thermal conductivity in a range that water passing through the water cooling pipe is maintained in a liquid state in the normal operation temperature range of the reactor, and have effective thermal conductivity in a range that the water passing through the water cooling pipe is boiled in the accident occurrence temperature range of the reactor.

According to another embodiment of the present invention, the functional conductor may include a first plate disposed relatively close to the air rising pipe, and a second plate disposed relatively close to the air falling pipe. The first plate and the second plate may be disposed to face each other at spaced positions, so that a fluid is filled between the first plate and the second plate.

According to another embodiment of the present invention, the fluid may suppress heat transfer between the first plate and the second plate in the normal operation temperature range of the reactor, and heat transfer through radiation may be performed from one of the first plate and the second plate to another in the accident occurrence temperature range of the reactor.

According to another embodiment of the present invention, each of the first plate and the second plate may be provided with a first surface and a second surface opposite to each other in a thickness direction thereof, so that heat conduction is performed from one of the first surface and the second surface to another surface.

According to another embodiment of the present invention, thermal conductivity from the one of the first surface and the second surface to the another surface may be 1 W/m·K or more.

According to another embodiment of the present invention, a surface of the first plate and a surface of the second plate may have emissivity of 0.60 to 0.95.

According to another example of the present invention, the first plate and the second plate may be formed of a metal and have a thickness of 0.1 mm to 5 mm.

According to another embodiment of the present invention, the fluid may contain at least one selected from a group including air, helium, nitrogen, and water.

According to another embodiment of the present invention, the functional conductor may further include lattices disposed between the first plate and the second plate, and a space to be filled with the fluid may be formed by the first plate, the second plate, and the lattices.

According to another embodiment of the present invention, the lattices may be formed of ceramic and have thermal conductivity of 0.1 W/m·K to 1.0 W/m·K.

According to another embodiment of the present invention, a length of each of the first plate and the second plate in a vertical direction may be greater than a thickness of the lattice, and a thickness ratio of the lattice to the vertical length of each of the first plate and the second plate may be 0.2 or less.

According to another embodiment of the present invention, the first plate, the second plate, the fluid, and the lattices may form a unit structure of the functional conductor, and the functional conductor may be formed by an assembly of the unit structures.

According to another embodiment of the present invention, the unit structures may be repeatedly arranged in the vertical direction and the thickness direction of the functional conductor.

According to another embodiment of the present invention, the passive reactor cavity cooling system may further include a water tank provided outside the containment structure.

The water cooling pipe may be connected to a lower portion of the water tank.

The water cooling pipe may extend along an inner space of the air falling pipe through the containment structure or along the inside of the wall of the containment structure.

The water cooling pipe may include a water falling part disposed outside the reactor cavity and connected to the water tank, and a water rising part extending along the inner space of the air falling pipe or along the inside of the wall of the containment structure. The water falling part and the water rising part may be connected through the containment structure.

According to another example of the present invention, the reactor cavity may be cooled by the first cooling system in the normal operation temperature range of the reactor, and may be cooled by the second cooling system when a function of the first cooling system is lost in the accident occurrence temperature range of the reactor. The residual heat of the core may be transferred to the atmosphere and soil through the containment structure when functions of the first cooling system and the second cooling system are all lost in the accident occurrence temperature range of the reactor.

According to another embodiment of the present invention, the first cooling system may be formed along an inner circumferential surface of the containment structure, and surround the reactor vessel at a position spaced apart from the reactor vessel.

DETAILED DESCRIPTION OF THE PREFERRED EMBODIMENT

Figure 1:
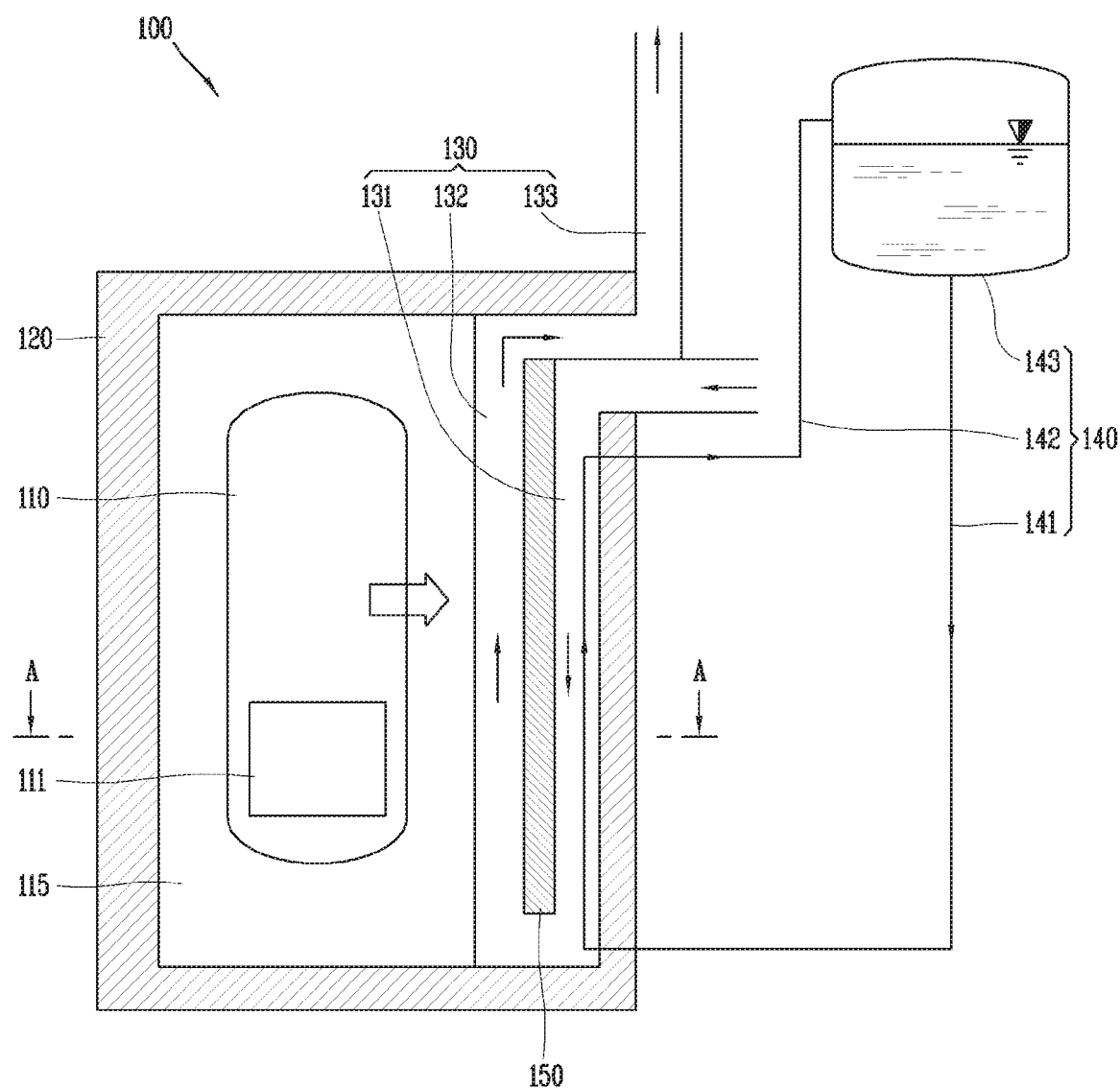
FIG. 1 is a conceptual view of a passive reactor cavity cooling system in accordance with an embodiment of the present invention.

Hereinafter, a passive reactor cavity cooling system according to the present invention will be described in detail with reference to the drawings. In this specification, the same/like reference numerals are given to the same/like configurations even in different embodiments, and the description thereof is replaced with the first description. It will be understood that when an element is referred to as being "connected with" another element, the element can be connected with the another element or intervening elements may also be present. In contrast, when an element is referred to as being "directly connected with" another element, there are no intervening elements present. A singular representation may include a plural representation unless it represents a definitely different meaning from the context.

Hereinafter, description will be given in detail of a configuration of a passive reactor cavity cooling system with reference to FIGS. 1 to 3. Next, description will be given of operations of the passive reactor cavity cooling system, respectively, during a normal operation of a reactor, upon an occurrence of an accident so that air cooling cannot be carried out, and upon an occurrence of an extreme accident so that air cooling and water cooling cannot be carried out.

FIG. 1 is a conceptual view of a passive reactor cavity cooling system 100 according to one embodiment of the present invention.

A core 111 is installed in an inner space of a reactor vessel 110. The reactor vessel 110 is formed to enclose the core 111. Heat generated by a nuclear reaction in the core 111 is used for power generation.

A containment structure 120 is formed to enclose the reactor vessel 110. The containment structure 120 may have a circular or rectangular cross section. The containment structure 120 encloses the reactor vessel 110 at a position spaced apart from the reactor vessel 110.

The containment structure 120 is for preventing leakage of a radioactive material. Generally, the containment structure 120 is formed of concrete. Since an outer surface of the reactor vessel 110 and an inner surface of the containment structure 120 are spaced apart from each other, a reactor cavity 115 is formed therebetween.

Residual heat of the core 111 is continuously transferred to the reactor cavity 115. In order to maintain the reactor in a safe state, the residual heat of the core 111 must be continuously removed from the reactor cavity 115. The passive reactor cavity cooling system 100 is configured to transfer the residual heat of the core 111 transferred to the reactor cavity 115 to the atmosphere (air) or the soil. The atmosphere or soil corresponds to a final heat sink to which the residual heat of the core 111 is transferred.

The passive reactor cavity cooling system 100 is formed along an inner circumferential surface of the containment structure. The passive reactor cavity cooling system 100 may be configured to surround the reactor vessel 110 at a position spaced apart from the reactor vessel 110.

The passive reactor cavity cooling system 100 includes a first cooling system 130 using air and a second cooling system 140 using water.

The first cooling system 130 includes an air falling pipe 131 and an air rising pipe 132. The air falling pipe 131 and the air rising pipe 132 are installed in the reactor cavity 115. The air falling pipe 131 is disposed behind the air rising pipe 132 with respect to a direction viewed from the reactor vessel 110. A chimney 133 for exhausting air is installed at the most downstream side of the air rising pipe 132 with respect to the flow of air. The first cooling system 130 is configured to guide external air to sequentially pass through the air falling pipe 131 and the air rising pipe 132 so that the residual heat of the core 111 transferred to the nuclear cavity 115 can be discharged to the atmosphere.

The external air sequentially passes through the air falling pipe 131 and the air rising pipe 132 by natural convection. Relatively cold air is introduced into the air falling pipe 131 through an inlet of the air falling pipe 131 and flows downward along the air falling pipe 131. The external air then rises along the air rising pipe 132 via a lower side of a functional conductor 150 to be described later. The air is supplied with the residual heat of the core 111 through the reactor cavity 115 during the process. When the residual heat of the core 111 is transferred to the air, the air increases in temperature so as to become relatively hot and then is naturally discharged to the atmosphere through the chimney 133.

The second cooling system 140 includes a water cooling pipe 141, 142, and the water cooling pipe includes a water falling part 141 and a water rising part 142. The water falling part 141 is provided outside the containment structure 120. The water rising part 142 is provided inside the containment structure 120. The water rising part 142 may be disposed in an inner space (or inner flow path) of the air falling pipe 131 or inside the containment structure 120. The water rising part 142 is disposed behind the air rising pipe 132 with respect to the direction viewed from the reactor vessel 110. Also, the water falling part 141 is disposed behind the water rising part 142 with respect to the direction viewed from the reactor vessel 110. The second cooling system 140 is configured to guide water to sequentially pass through the water falling part 141 and the water rising part 142 so that the residual heat of the core 111 transferred to the nuclear cavity 115 can be discharged to the outside.

The most upstream side of the water falling part 141 and the most downstream side of the water rising part 142 are connected to a water tank 143 (or tank) provided outside the containment structure 120. Relatively cold water in the water tank 143 flows downward along the water falling part 141. The water then receives the residual heat of the core 111 while flowing upward along the water rising part 142. The water in the water tank 143 can remove the residual heat of the core 111 while sequentially passing through the water falling part 141 and the water rising part 142 by natural circulation. The water in the water tank 143 discharges the heat to the atmosphere.

As illustrated in FIG. 1, a heat exchanger (not shown) is installed in an inner space of the water tank 143. The most upstream side of the water falling part 141 and the most downstream side of the water rising part 142 may be connected to an outlet and an inlet of the heat exchanger, respectively. In this case, the water falling part 141, the water rising part 142, and the heat exchanger form a closed flow path for circulation of water. Water in the water tank 143 does not circulate along the water falling part 141 and the water rising part 142 but the residual heat of the core 111 is transferred to the water tank 143 through water circulating along the closed flow path.

The functional conductor 150 is disposed between the air falling pipe 131 and the air rising pipe 132. Accordingly, the air rising pipe 132, the functional conductor 150, and the air falling pipe 131 are sequentially arranged with respect to the direction viewed from the reactor vessel 110.

In the present invention, the functional conductor 150 refers to an object which has an insulating property in a normal operation temperature range of a reactor and has a heat transfer property in an accident occurrence temperature range of the reactor. How a heat transfer property of the functional conductor 150 can be changed according to a temperature and a related configuration will be described later with reference to FIG. 4 and subsequent drawings.

Figure 2A:
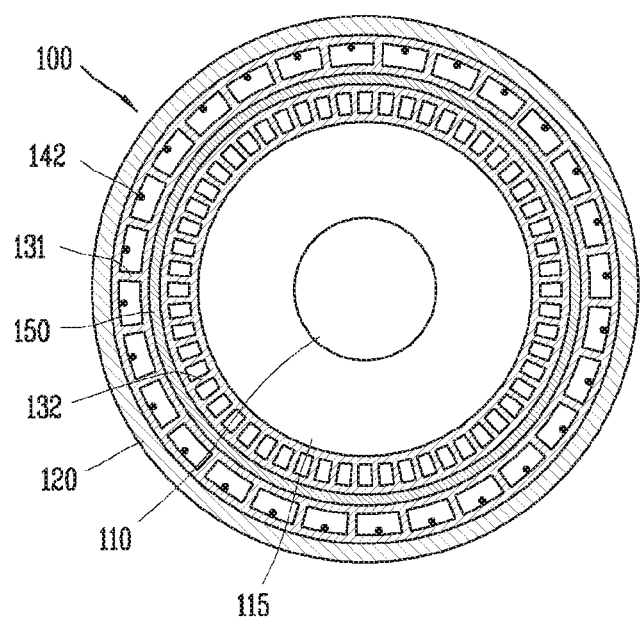
FIGS. 2A and 2B are sectional views of the passive reactor cavity cooling system of FIG. 1, cut along line A-A and viewed from a top.
Figure 2B:
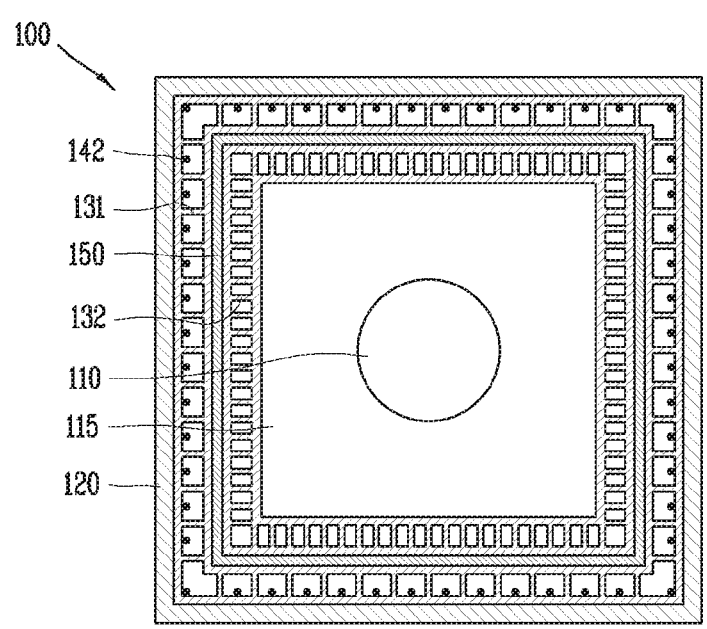

FIGS. 2A and 2B are sectional views of the passive reactor cavity cooling system 100 of FIG. 1, cut along line A-A and viewed from a top.

The containment structure 120 has a circular or rectangular cross section. FIG. 2A illustrates a structure with a circular cross section and FIG. 2B illustrates a structure with a rectangular cross section.

The air falling pipe 131 and the air rising pipe 132 are formed along an inner circumferential surface of the containment structure 120. An assembly of the air falling pipes 131 and an assembly of the air rising pipes 132 may have a structure corresponding to the containment structure 120. For example, as illustrated in FIG. 2A, the assembly of the air falling pipes 131 and the assembly of the air rising pipes 132 may have a circular cross section. Also, as illustrated in FIG. 2B, the assembly of the air falling pipes 131 and the assembly of the air rising pipes 132 may have a rectangular cross section.

The assembly of the air falling pipes 131 and the assembly of the air rising pipes 132 are formed to surround the reactor vessel 110 at a position spaced apart from the reactor vessel 110.

The reactor vessel 110, the air falling pipe 131, the air rising pipe 132, the water rising part 142, and the functional conductor 150 are disposed in an area enclosed by the containment structure 120. The air rising pipe 132, the functional conductor 150, and the air falling pipe 131 are sequentially arranged with respect to the direction viewed from the reactor vessel 110.

The water rising part 142 is disposed in the inner space (the inner flow path) of the air falling pipe 131. The air falling pipe 131 is provided in plurality in the passive reactor cavity cooling system 100, and the water rising parts 142 are disposed in the air falling pipes 131 one by one. At this time, the water rising part 142 is disposed at a position eccentric from a center of the air falling pipe 131 in the inner space of the air falling pipe 131 so as not to interfere with inflow of air. For example, the water rising part 142 may be closely adhered on an inner wall surface of the air falling pipe 131. The water rising part 142 may be disposed adjacent to a portion, which is close to the containment structure 120, of the inner wall surface of the air falling pipe 131.

In the normal operation range of the reactor, air flows downward through a space between an outer surface of the water rising part 142 and an inner surface of the air falling pipe 131. When the function of the first cooling system 130 is lost, water flows upward by being boiled due to the residual heat of the core 111 transferred through the functional conductor 150 while flowing in the inner space of the water rising part 142.

Figure 3A:
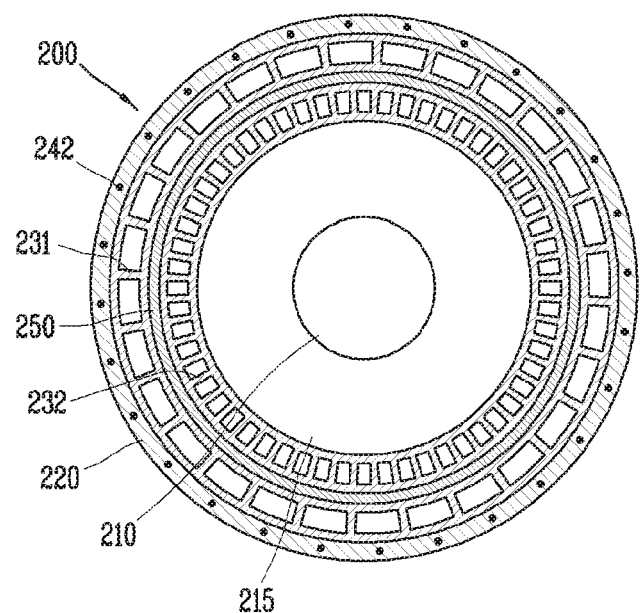
FIGS. 3A and 3B are sectional views illustrating variations of FIGS. 2A and 2B.
Figure 3B:
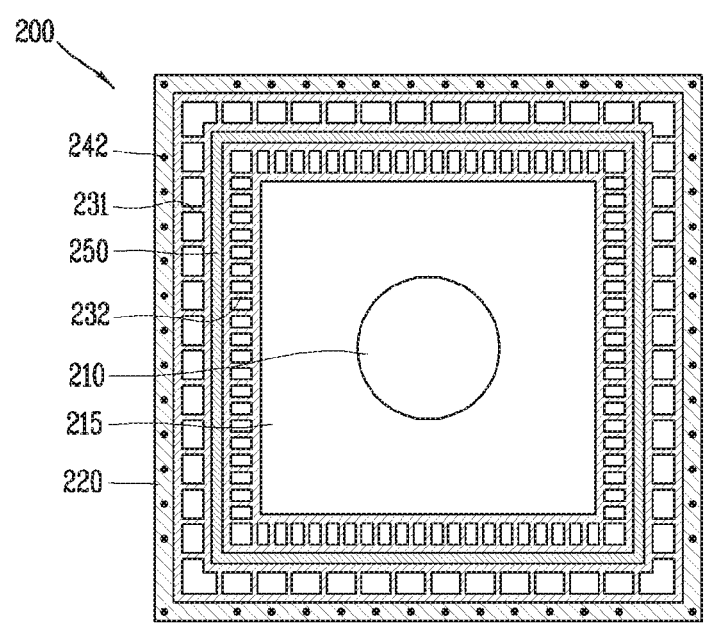

FIGS. 3A and 3B are sectional views illustrating a variation of FIGS. 2A and 2B.

The other configurations are the same as those described in FIGS. 2A and 2B. However, a water rising part 242 is not disposed in an inner space of an air falling pipe 231, but is disposed in a wall of a containment structure 220.

Water rising parts 242 are disposed at positions spaced apart from one another inside the wall of the containment structure 220. The water rising parts 242 are disposed along a circumference of the containment structure 220.

In FIGS. 3A and 3B, unexplained reference numeral 200 denotes a passive reactor cavity cooling system, 210 denotes a reactor vessel, 215 denotes a reactor cavity, 232 denotes an air rising pipe, and 250 denotes a functional conductor.

Hereinafter, operations of the passive reactor cavity cooling system 100, 200 will be described with reference to FIGS. 1 to 3. In order to explain the operations of the passive reactor cavity cooling system 100, 200, it is necessary to distinguish a situation of a normal operation of the reactor, a situation of an occurrence of an accident so that air cooling cannot be carried out, and a situation of an occurrence of an extreme accident so that air cooling and water cooling cannot be carried out.

First, during the normal operation of the reactor, the residual heat of the core 111 is transferred to the air rising pipe 132, 232 through the reactor cavity and air is cooled by the first cooling system 130. In a normal operation temperature range of the reactor, the functional conductor 150, 250 has an insulating property. Therefore, heat transfer from the air rising pipe 132, 232 to the air falling pipe 131, 231 or the water rising part 142, 242 disposed behind the air rising pipe 132, 232 is suppressed by the functional conductor 150, 250.

The residual heat of the core 111 is transferred to the air which sequentially passes through the air falling pipe 131, 232 and the air rising pipe 132, 232 by natural circulation of air, and air receiving the residual heat of the core 111 flows upward by a buoyant force to be discharged through the chimney 133. Then, cold external air is introduced again into empty spaces of the air falling pipe 131, 231 and the air rising pipe 132, 232 from which hot air has escaped.

Heat transfer from the air rising pipe 132, 232 to the air falling pipe 131, 231 interferes with the natural circulation of air. In a normal operation temperature range of the reactor, the functional conductor 150, 250 has an insulating property, which helps to smooth the natural circulation of air.

Next, water cooling is performed by the second cooling system 140 upon an occurrence of an accident by which air cooling cannot be performed. If the first cooling system 130 operates normally when an accident occurs in the reactor, the residual heat of the core 111 can be removed as in the normal operation of the reactor. However, when an accident such as a collapse of the chimney 133 or damage on a part or all of the first cooling system 130 occurs, the function of the first cooling system 130 is lost.

Thus, the second cooling system 140 corresponds to an auxiliary system that operates when the function of the first cooling system 130 is lost. In the Patent document described in the technical field as the background of the invention, air cooling and water cooling are in parallel configuration to each other and thus are simultaneously performed. However, as illustrated in the present invention, if the second cooling system 140 corresponds to the auxiliary system of the first cooling system 130, the second cooling system 140 operates only when the first cooling system 130 does not operate.

The reason why the second cooling system 140 can operate as the auxiliary system of the first cooling system 130 is that the functional conductor 150, 250 loses its insulating property and exhibits a heat transfer property when an accident occurs in the reactor. When the functional conductor 150, 250 has the heat transfer property, the residual heat of the core 111 transferred to the air rising pipe 132, 232 is transferred up to the air falling pipe 131, 231 and the water rising part 142, 242 by the functional conductor 150, 250. The residual heat of the core 111 is removed by the second cooling system 140.

In an accident occurrence temperature range of the reactor, water passing through the water rising part 142, 242 is boiled up by the residual heat of the core 111 transferred through the functional conductor 150, 250. This is because the functional conductor 150, 250 has effective thermal conductivity enough to cause boiling of the water passing through the water rising part 142, 242. Since a large quantity of residual heat is absorbed while the water is boiled, the residual heat of the core 111 can be removed by the second cooling system 140.

Water vapor or steam generated in the water rising part 142, 242 may be collected and condensed in the water tank 143. The water tank 143 may be provided with a vapor cooling pipe, a heat pipe, and the like for condensing and/or discharging vapor.

Lastly, when the functions of the first cooling system 130 and the second cooling system 140 are lost in the accident occurrence temperature range of the reactor, the residual heat of the core 111 is transferred to the atmosphere and the soil through the containment structure 120, 220. In the accident occurrence temperature range of the reactor, the functional conductor 150, 250 loses its insulating property and has the heat transfer property. Therefore, the residual heat of the core 111 is transferred to the containment structure 120, 220 via the air rising pipe 132, 232 and the functional conductor 150, 250 and is discharged to the atmosphere or the soil.

Hereinafter, the configuration of the functional conductor 150, 250 having the insulating property or the heat transfer property according to the temperature range will be described.

Figure 4:
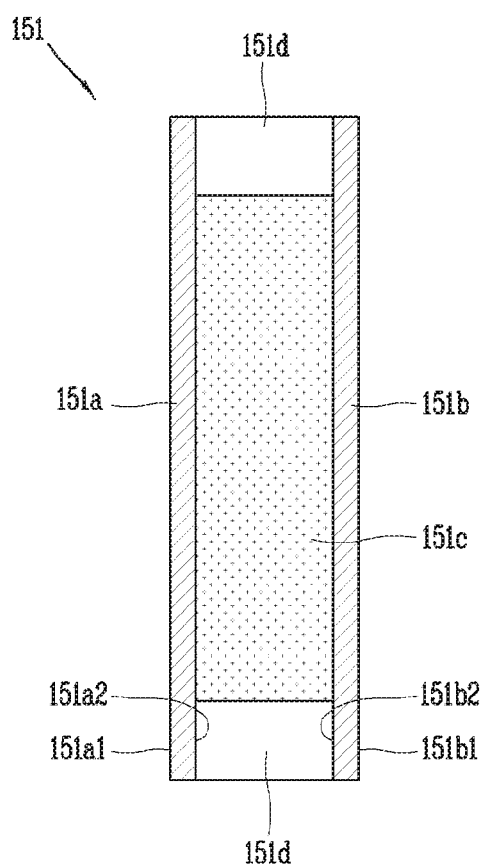
FIG. 4 is a conceptual view illustrating a unit structure of a functional conductor provided in a passive reactor cavity cooling system.

FIG. 4 is a conceptual view illustrating a unit structure 151 of the functional conductor 150 provided in the passive reactor cavity cooling system 100.

The unit structure 151 of the functional conductor 150 include two plates 151a and 151b arranged to be spaced apart from each other. The functional conductor 150 is disposed between the air falling pipe 131 and the air rising pipe 132. Therefore, one of the two plates 151a and 151b is disposed relatively close to the air falling pipe 131, and the other is disposed relatively close to the air rising pipe 132. For convenience of explanation, the one of the two plates 151a and 151b, which is disposed close to the air rising pipe 132, is referred to as a first plate 151a, and the other disposed relatively close to the air falling pipe 131 is referred to as a second plate 151b.

Each of the first plate 151a and the second plate 151b includes a first surface 151a1, 151b1 and a second surface 151a2, 151b2 facing opposite sides in a thickness direction. Here, the thickness direction means the same direction as a direction viewing the functional conductor 150 from the reactor vessel 110. Heat transfer is caused by conduction from the first surface 151a1, 151b1 to the second surface 151a2, 151b2 of each plate 151a, 151b or from the second surface 151a2, 151b2 to the first surface 151a1, 151b1.

In order to prevent a rapid temperature gradient by the conduction from the first surface 151a1, 151b1 to the second surface 151a2, 151b2 or from the second surface 151a2, 151b2 to the first surface 151a1, 151b1, the thermal conductivity of each of the first plate 151a and the second plate 151b is preferably 1 W/m·K or more. This is because a drastic temperature difference between the first surface and the second surface caused by thermal conductivity interferes with radiative heat transfer between the first plate 151a and the second plate 151b.

The first plate 151a and the second plate 151b are formed of a metal. A thickness of each of the first plate 151a and the second plate 151b may be in the range of 0.1 mm to 5 mm. If the thickness of each of the first plate 151a and the second plate 151b is smaller than 0.1 mm, structural integrity of the plate as a conductor is deteriorated. On the other hand, if the thickness of each of the first plate 151a and the second plate 151b exceeds 5 mm, the conductor becomes excessively thick in thickness and a heat transfer rate is lowered.

The first plate 151a and the second plate 151b are disposed to face each other at positions spaced apart from each other such that a fluid 151c is filled between the first plate 151a and the second plate 151b. When the first plate 151a and the second plate 151b are spaced apart from each other, a space to be filled with the fluid 151c is formed therebetween.

Here, the fluid 151c contains at least one selected from a group including air, helium, nitrogen, and water. The fluid 151c is generally composed of air, but helium, nitrogen or water may be filled between the first plate 151a and the second plate 151b if necessary.

The fluid 151c filled between the first plate 151a and the second plate 151b provides the insulating property to the functional conductor 150 in the normal operation temperature range of the reactor. Thermal conductivity of the fluid 151c is significantly lower than thermal conductivity of the first plate 151a and thermal conductivity of the second plate 151b. Therefore, the heat transfer from the first plate 151a to the second plate 151b is suppressed by the fluid 151c.

The surfaces 151a1 and 151a2 of the first plate 151a and the surfaces 151b1 and 151b2 of the second plate 151b are surface-treated to have high emissivity. For example, a paint or powder spray made of a material with high emissivity may be coated on the surfaces 151a1 and 151a2 of the first plate 151a and the surfaces 151b1 and 151b2 of the second plate 151b. An example of the powder spray made of the material with the high emissivity is graphite spray. Accordingly, the first plate 151a and the second plate 151b have emissivity ε ranging from 0.60 to 0.95.

According to Stefan-Boltzmann's law that a total amount of radiant energy emitted from an object is proportional to the fourth power of an absolute temperature T of the object, it is predominantly influenced by radiation-induced heat transfer mechanisms at high temperature. The radiation-induced heat transfer mechanism differs from a heat transfer mechanism such as conduction or convection, and thus heat is transferred instantaneously from a hot body to a cold body at the same speed as light even without a medium of transferring heat.

Thus, a high-emissivity surface treatment provides the heat transfer property to the functional conductor 150 in the accident occurrence temperature range of the reactor. The accident occurrence temperature range of the reactor is a much higher temperature environment than the normal operation temperature range of the reactor.

If the emissivity of the first plate 151a and the emissivity of the second plate 151b are lower than 0.60, there is a problem that radiation heat transfer does not sufficiently take place in a high temperature environment which is the accident occurrence temperature range. If the emissivity of the first plate 151a and the emissivity of the second plate 151b exceed 0.95, the radiation heat transfer occurs more than necessary even in a low temperature environment, which is the normal operation temperature range of the reactor, and thereby the heat insulating function cannot be sufficiently performed. Especially, when the emissivity of the first plate 151a and the second plate 151b is 0.8 or more in a state where the functional conductor 150 is spaced apart from other structures, an unexpected drastic temperature gradient can be suppressed. For example, it is possible to prevent the formation of the drastic temperature gradient through thermal radiation in a region where heat conduction does not occur.

The functional conductor 150 may further include lattices 151d.

The lattices 151d are disposed between the first plate 151a and the second plate 151b. A filling space for the fluid 151c is formed by the first plate 151a, the second plate 151b and the lattices 151d.

If the fluid 151c to be filled between the first plate 151a and the second plate 151b is helium, nitrogen or water, the lattice 151d may have a loop shape. Accordingly, a hermetic space to be filled with the fluid 151c is formed between the first plate 151a and the second plate 151b.

If the fluid 151c to be filled between the first plate 151a and the second plate 151b is air, the lattices 151d may have a beam shape. Accordingly, an opened space to be filled with the fluid 151c is formed between the first plate 151a and the second plate 151b.

For insulation, thermal conductivity of the lattice 151d is preferably in the range of 0.1 W/m·K to 1.0 W/m·K, and a material of the lattice 151d is preferably ceramic. However, the material of the lattice 151d is not necessarily ceramic, but may alternatively be a metal. However, if the thermal conductivity of the lattice 151d exceeds 1.0 W/m·K, the functional conductor 150 does not sufficiently perform the heat insulating function, and thus the thermal conductivity of the lattice 151d is preferably 1.0 W/m·K or less.

Lengths of the first plate 151a and the second plate 151b in a vertical or up/down direction are larger than a thickness of the lattice 151d. The vertical length of each of the first plate 151a and the second plate 151b indicates a vertical length in FIG. 4. The thickness of the lattice 151d indicates a length in a left and right direction in FIG. 4.

A ratio of the thickness of the lattice 151d to the vertical lengths of the first plate 151a and the second plate 151b is 0.2 or less. If the ratio exceeds 0.2 due to an increase in the thickness of the lattice 151d, the heat transfer through convection of the fluid 151c increases and thereby the functional conductor 150 does not sufficiently perform the heat insulating function. Also, the performance of the functional conductor 150 varies depending on an installation position in a gravity direction.

Figure 5:
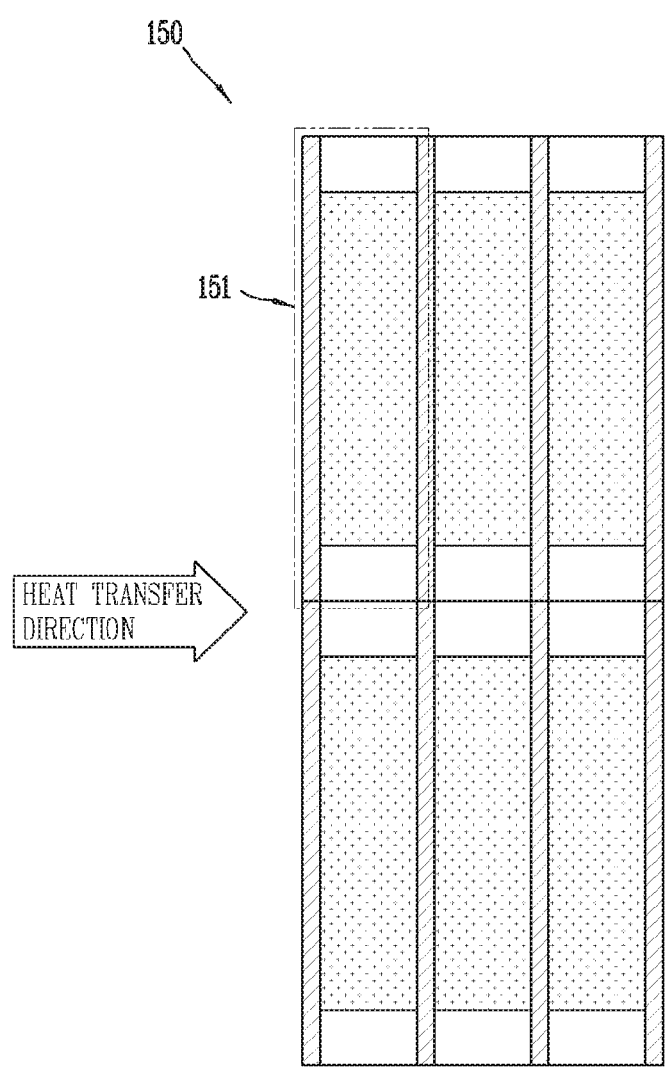
FIG. 5 is a conceptual view illustrating a functional conductor formed of an assembly of unit structures.

FIG. 5 is a conceptual view illustrating the functional conductor 150 formed of an assembly of the unit structures 151.

The first plate 151a, the second plate 151b, the fluid 151c and the lattices 151d form a unit structure 151 of the functional conductor 150. The functional conductor 150 are formed by an assembly of the unit structures 151. For example, a plurality of unit structures 151 is arranged along a vertical or up/down direction and a thickness direction of the functional conductor 150 in a repeated manner, and the functional conductors 150 are formed by this repetitive arrangement.

However, it should not be understood that the first plate 151a is disposed again behind the second plate 151b in a contact manner although the unit structure 151 includes the first plate 151a and the second plate 151b. As illustrated in FIG. 5, the plurality of plates 151a and 151b is sequentially disposed with being spaced apart from one another in a manner of interposing the lattices 151d therebetween, and the fluid 151c is filled between the plurality of plates 151a and 151b. Such a unit structure 151 is repeatedly arranged to form the functional conductor 150.

Hereinafter, a heat transfer mechanism of the functional conductor 150 will be described.

Figure 6:
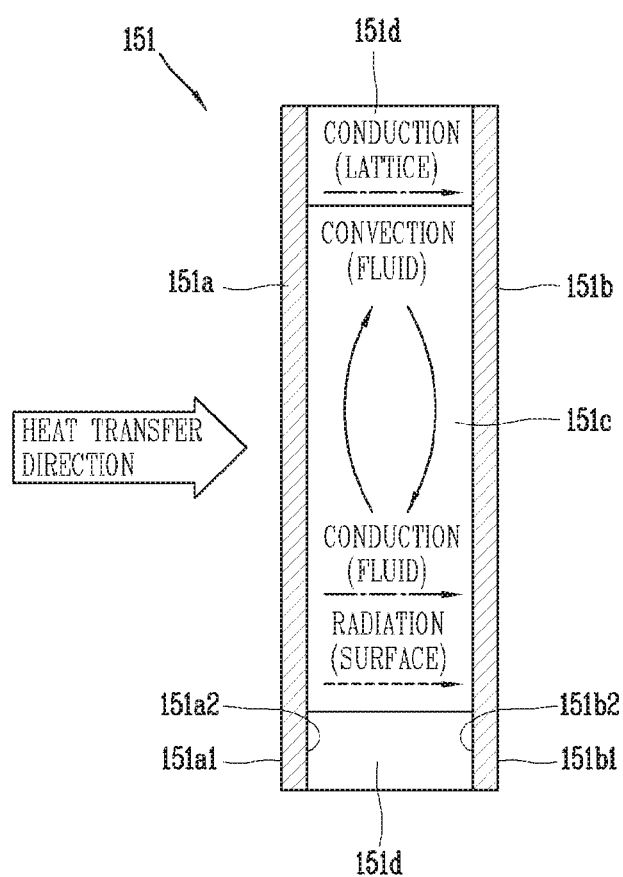
FIG. 6 is a conceptual view illustrating a heat transfer mechanism occurring in a unit structure of a functional conductor.

FIG. 6 is a conceptual view illustrating a heat transfer mechanism occurring in the unit structure 151 of the functional conductor 150.

Heat transfer through conduction occurs in the first plate 151a and the second plate 151b. For example, heat transfer through conduction occurs from the first surface 151a1 to the second surface 151a2 of the first plate 151a and from the first surface 151b1 to the second surface 151b2 of the second plate 151b.

The fluid 151c is filled between the first plate 151a and the second plate 151b. Therefore, the heat transfers through the conduction and the convection do not occur from the first plate 151a to the second plate 151b. Also, the heat transfer through the conduction does not occur since the lattices 151d are disposed between the first plate 151a and the second plate 151b. However, since the thermal conductivities of the fluid 151c and the lattices 151d are very lower than the thermal conductivities of the first and second plates 151a and 151b, the functional conductor 150 has an insulating property at a low temperature which is the normal operation temperature range of the reactor.

In the accident occurrence temperature range, which is a much higher temperature environment than the normal operation temperature range of the reactor, heat transfer through radiation occurs directly from the first plate 151a to the second plate 151b. In particular, the radiation does not require a heat transfer medium. Also, because radiation is proportional to the fourth power of an absolute temperature of an object, the heat transfer through the radiation occurs actively at the accident occurrence temperature of the reactor. Accordingly, when the residual heat of the core transferred to the functional conductor 150 increases due to an accident occurred in the reactor, the temperature of the functional conductor 150 increases and the property of the functional conductor 150 is passively switched from the insulating property to the heat transfer property.

The performance of the functional conductor 150 may be defined as follows.

In the normal operation state of the reactor, the functional conductor 150 should have low effective thermal conductivity such that water flowing along the water rising part (142 of FIG. 2, 242 of FIG. 3) is not boiled in a low temperature range. And the functional conductor 150 should have high effective thermal conductivity such that the water flowing in the water rising part 142, 242 is boiled in a high temperature range such as an accident occurrence state.

Hereinafter, description will be made with reference to a thermal resistance diagram of the functional conductor.

Figure 7:
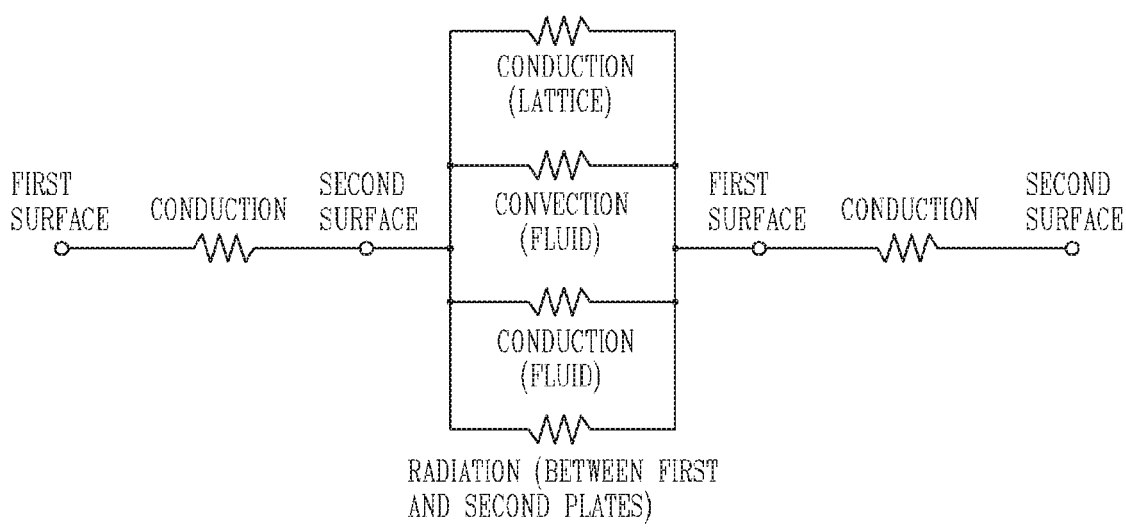
FIG. 7 is a diagram illustrating thermal resistance for a unit structure of a functional conductor.

FIG. 7 is a diagram illustrating thermal resistance for a unit structure of a functional conductor.

Heat transfer through conduction occurs between the first and second surfaces of the first plate. Also, heat transfer through conduction occurs between the first and second surfaces of the second plate. This is because the first plate and the second plate are formed of a metal material having high thermal conductivity.

In a low temperature environment such as a normal operation state of a reactor, conduction and convection of heat through the fluid and conduction of heat through the lattices occur. However, since the thermal conductivities of the fluid and lattices are very low, the functional conductor has an insulating property.

Then, when the functional conductor is suddenly exposed to a high-temperature environment such as an accident occurrence state of the reactor, heat transfer through radiation occurs from the first plate to the second plate. This is because the surface of the first plate and the surface of the second plate are treated with a material having high emissivity.

A typical thermal conductor performs only a heat transfer function, and a typical insulating material performs only an insulating function. Therefore, in order to perform both the heat transfer function and the insulating function, each facility must be provided. Further, in order to switch the heat transfer function and the insulating function in one area, equipment for switching a position of a facility for performing the heat transfer function and a position of a facility for performing the insulating function should be additionally provided.

On the other hand, the functional conductor of the present invention can switch the insulating property and the heat transfer property in the passive manner, which may allow a reduction of an additional facility cost and ensure highly reliable performance.

The emissivity of each of the first and second plates is adjustable. Also, a radiation heat transfer amount (or radiation heat transfer rate) can be adjusted by adjusting areas of the first and second plates and a distance between them. The thermal conductivity may also be adjusted by adjusting a material, sectional area and thickness of the lattice. Thermal conduction and convention may also be adjusted based on a type of fluid and a size of a space to be filled with the fluid. Thus, the functional conductor can be designed to have characteristics appropriate for each reactor.

An application area of the functional conductor may increase if the unit structures of the functional conductor are repeatedly stacked along a direction perpendicular to a heat transfer direction. If the shape of the first plate, the second plate and the lattice is adjusted, the functional conductor may also be applied to a curved structure.

On the other hand, if unit structures of a general conductor are stacked in parallel with the heat transfer direction, an additional insulating performance can be obtained. At this time, performance of such assembly is not directly proportional to the number of unit structures in view of its characteristics. This is because variation of performance depending on temperature is large due to more affection by radiation heat transfer than by conduction or convention heat transfer. However, in the present invention, the performance of the functional conductor may be predicted from the performance depending on the temperature of the unit structure.

Hereinafter, various shapes of the unit structure will be described.

Figure 8:
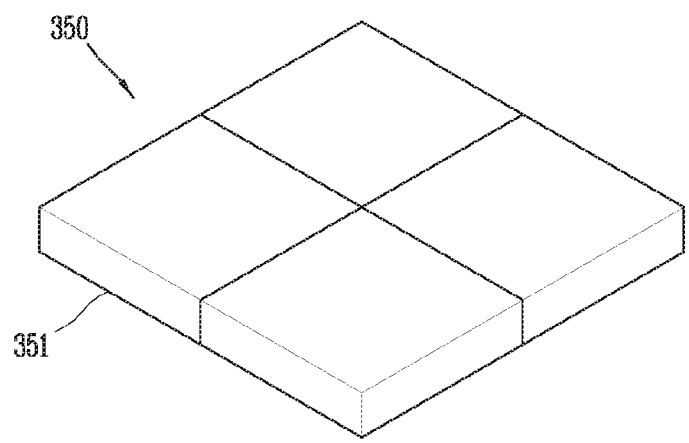
FIG. 8 is a conceptual view illustrating a shape of a unit structure of a functional conductor and its assembly.

FIG. 8 is a conceptual view illustrating a shape of a unit structure of a functional conductor and its assembly.

FIG. 8 illustrates an example in which four unit structures 351 are assembled to form one functional conductor 350. Each of the first plate and the second plate is formed in a shape of a rectangular parallelepiped having a rectangular cross section. The lattice has a rectangular cross section, and a center of the lattice is opened toward both the first plate and the second plate.

Figure 9:
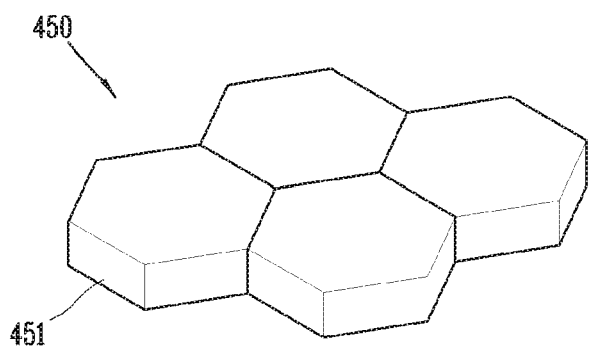
FIG. 9 is a conceptual view illustrating another shape of a unit structure of a functional conductor and its assembly.

FIG. 9 is a conceptual view illustrating another shape of a unit structure of a functional conductor and its assembly.

FIG. 9 illustrates an example in which four unit structures 451 are assembled to form one functional conductor 450. Each of the first plate and the second plate is formed in an octahedral shape having a hexagonal cross section. The lattice has a hexagonal cross section, and a center of the lattice is opened toward both the first and second plates.

Hereinafter, experimental results of thermal conductivity of the functional conductor will be described.

Figure 10:
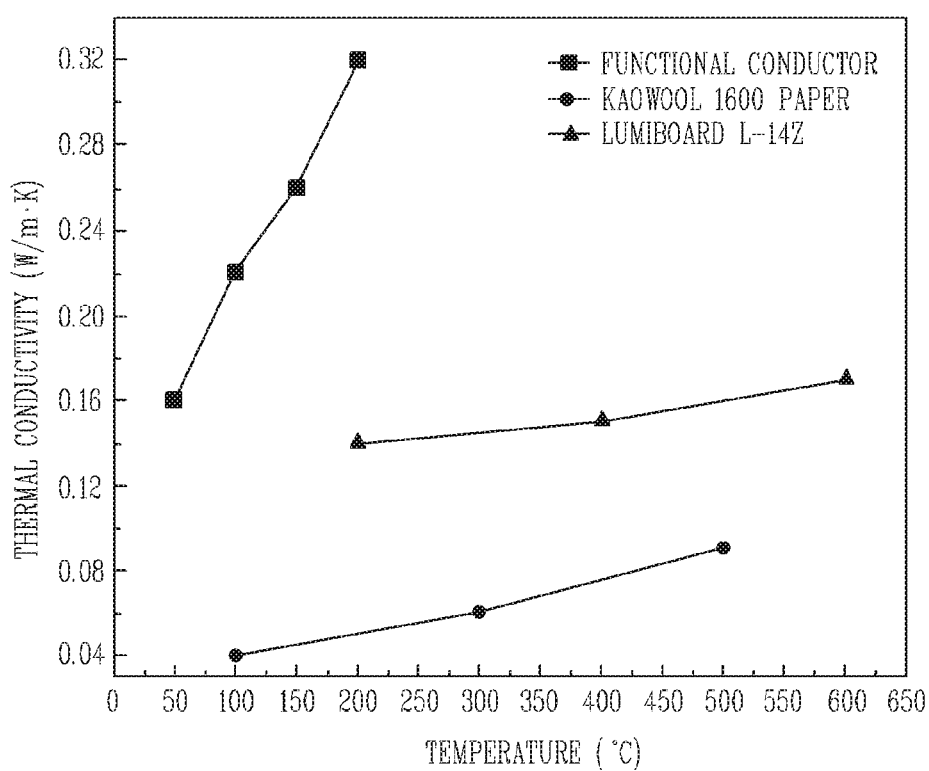
FIG. 10 is a graph comparing thermal conductivity of a functional conductor with those of other conductors according to temperature.

FIG. 10 is a graph comparing thermal conductivity of a functional conductor with those of other conductors according to temperature.

Thermal conductivities were measured while raising temperature using a protective hot plate technique (ISO 3802, ASTM C177 Technical Standard) standardized for functional conductors. The graph of FIG. 10 also shows thermal conductivities provided by sellers of Kaowool's commercial 1600 paper and Lumiboard L-14Z.

It can be seen from FIG. 10 that the thermal conductivity of the functional conductor rises sharply as the temperature rises compared with commercial insulators. Specifically, even when the temperature rises above 600° C., the thermal conductivities of the commercial insulators are lower than 0.20 W/m·K. On the other hand, the thermal conductivity of the functional conductor already exceeds 0.3 W/m·K at a temperature of about 200° C. As a result, it can be confirmed that the functional conductor can effectively perform a heat radiation function in a high temperature environment such as an accident occurrence state.

Hereinafter, another embodiment of the passive reactor cavity cooling system will be described.

Figure 11:
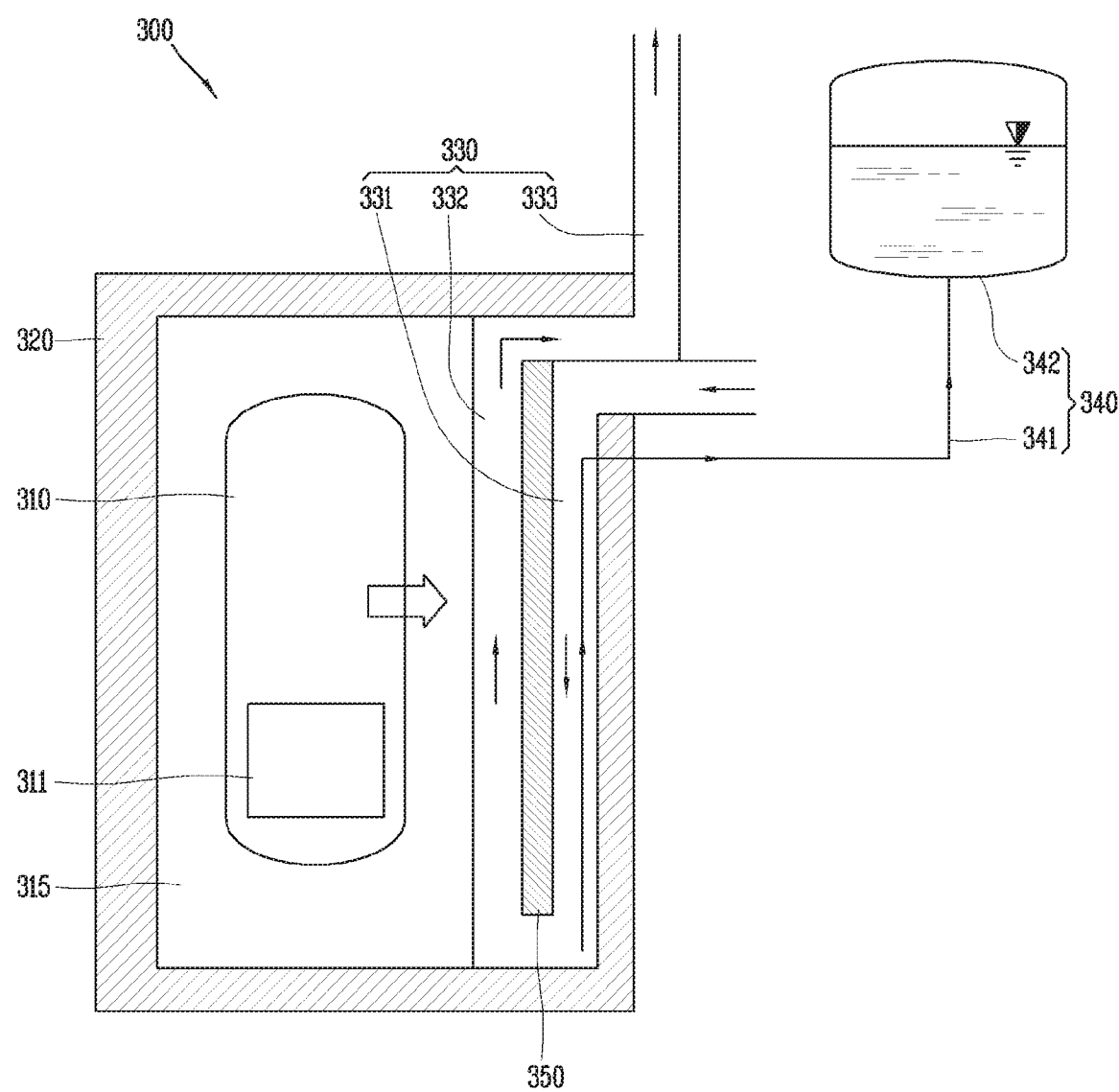
FIG. 11 is a conceptual view of a passive reactor cavity cooling system according to another embodiment of the present invention.

FIG. 11 is a conceptual view of a passive reactor cavity cooling system 300 according to another embodiment of the present invention.

Other configurations are the same/like as those illustrated in FIG. 1, except for a second cooling system 340. A water cooling pipe 341 illustrated in FIG. 11 is configured as a single pipe, unlike the aforementioned water cooling pipe which is provided with the water falling part and the water rising part.

The water cooling pipe 341 is connected to a lower portion of a water tank 342. The water cooling pipe 341 may extend along an inner space of an air falling pipe 331 through the containment structure 320. Alternatively, the water cooling pipe 341 may extend along an inside of a wall of the containment structure 320.

Residual heat of a core 311 is transferred to the water cooling pipe 341 through a functional conductor 350 when a function of a first cooling system 330 is lost in an accident occurrence temperature range. Water in the water cooling pipe 341 is boiled by the residual heat of the core 311 and the residual heat of the core 311 may be removed by latent heat of evaporation.

Steam or vapor generated by boiling the water in the water cooling pipe 341 flows upward by buoyancy along the water cooling pipe 341 and then flows into an empty space above water inside the water tank 342. At the same time, water is replenished from the water tank 342 to the water cooling pipe 341 as much as a volume of steam.

In FIG. 11, an unexplained reference numeral 310 denotes a reactor vessel, 315 denotes a reactor cavity, 332 denotes an air rising pipe, and 333 denotes a chimney.

According to the present invention having the above-described configuration, a second cooling system using water for cooling corresponds to an auxiliary system of a first cooling system using air for cooling. This is because a functional conductor has an insulating property or a heat transfer property depending on a temperature range. Accordingly, the second cooling system operates only when a function of the first cooling system is lost.

When the second cooling system operates as the auxiliary system of the first cooling system, it is possible to ensure stability of a first stage by air cooling and a second stage by water cooling when an air cooling function has been lost, as compared with the related art reactor cavity cooling system simultaneously using air and water.

In particular, according to the present invention, safety of an entire reactor can be greatly improved by multiple barriers by air cooling and water cooling.

Further, when the second cooling system operates as the auxiliary system of the first cooling system, only the first cooling system operates during a normal operation of the reactor, so that residual heat of the core can be effectively removed without deteriorating thermal efficiency of the entire reactor even if a cooling design capacity of the first cooling system or the second cooling system is increased.

However, an average residual heat output from the core is about 1% of a normal operation output. Therefore, if the design capacity of the second cooling system, which is the auxiliary system of the first cooling system, is about 1% of the normal output of the reactor, a minimum function can be secured.

According to the above configuration, a reactor cavity can be cooled (i.e., the residual heat of the core can be removed) by the first cooling system at a low temperature such as a normal operation temperature range of the reactor. In addition, when a function of the first cooling system is lost at a high temperature such as an accident occurrence temperature range of the reactor, the reactor cavity can be cooled by the second cooling system. Finally, when the functions of the first and second cooling systems are all lost in the accident occurrence temperature range of the reactor, the residual heat of the core is transferred to the atmosphere and the soil through a containment structure. Accordingly, introduction of the present invention can ultimately improve safety of the nuclear reactor.

The aforementioned passive reactor cavity cooling system is not limited to the configurations and the methods of the embodiments described above, but the embodiments may be modified so that all or some of the embodiments are selectively combined.

What is claimed is:

1. A passive reactor cavity cooling system, comprising:
a reactor cavity formed between a reactor vessel and a containment structure enclosing the reactor vessel; a first cooling system to control external air to sequentially pass through an air falling pipe and an air rising pipe provided in the reactor cavity, so that residual heat of a core transferred to the reactor cavity is discharged to an atmosphere or removed;

a second cooling system having a water cooling pipe disposed in an inner space of the containment structure or in a wall of the containment structure to discharge the residual heat of the core transferred to the reactor cavity to outside the atmosphere or removed; and a functional conductor having an insulating property in a normal operation temperature range of a reactor and a heat transfer property in an accident occurrence temperature range of the reactor which is a higher temperature environment than the normal operation temperature range, wherein the air falling pipe and the water cooling pipe are disposed behind the air rising pipe with respect to a direction viewed from the reactor vessel, and the functional conductor is disposed between the air falling pipe and the air rising pipe, wherein the functional conductor comprises:

a first plate disposed close to the air rising pipe;

a second plate disposed close to the air falling pipe, wherein the first plate and the second plate are disposed to face each other at spaced positions, so that a fluid is filled between the first plate and the second plate;

lattices disposed between the first plate and the second plate, and wherein a space to be filled with the fluid is formed by the first plate, the second plate, and the lattices; and wherein the first plate, the second plate, the fluid, and the lattices form a unit structure of the functional conductor, and the functional conductor is formed by an assembly of the unit structures, thereby the plurality of plates is sequentially disposed and spaced apart from one another in a manner of interposing the lattices therebetween, and the fluid is filled between the plurality of plates.

2. The system of claim 1, further comprising a water tank provided outside the containment structure, wherein the water cooling pipe comprises:

a water falling part connected to the water tank; and a water rising part extending along an inner space of the air falling pipe or along inside of the wall of the containment structure, wherein the water falling part and the water rising part are connected through the containment structure.

3. The system of claim 1, wherein the first cooling system is formed along an inner circumferential surface of the containment structure and surrounds the reactor vessel at a position spaced apart from the reactor vessel.

4. The system of claim 1, wherein the reactor cavity is cooled by the first cooling system in a normal operation temperature range of the reactor, and wherein the reactor cavity is cooled by the second cooling system when a function of the first cooling system is lost in an accident occurrence temperature range of the reactor.

5. The system of claim 1, further comprising a water tank provided outside the containment structure, wherein the water cooling pipe is connected to a lower portion of the water tank.

6. The system of claim 1, wherein the water cooling pipe extends along an inner space of the air falling pipe through the containment structure or along the inside of the wall of the containment structure.

7. The system of claim 1, wherein the functional conductor has effective thermal conductivity in a range that water passing through the water cooling pipe is maintained in a liquid state in the normal operation temperature range of the reactor, and wherein the functional conductor has effective thermal conductivity in a range that the water passing through the water cooling pipe is boiled in the accident occurrence temperature range of the reactor.

8. The system of claim 1, wherein the fluid suppresses heat transfer between the first plate and the second plate in the normal operation temperature range of the reactor, and heat transfer through radiation is performed from one plate of the first and second plates to another plate of the first and second plates in the accident occurrence temperature range of the reactor.

9. The system of claim 1, wherein each of the first plate and the second plate is provided with a first surface and a second surface opposite to each other on each of the first plate and the second plate, so that heat conduction is performed from one surface of the first and the second surfaces to another surface of the first and second surfaces.

10. The system of claim 9, wherein thermal conductivity from one surface of the first and second surfaces to another surface of the first and second surfaces is 1 W/m·K or 5 more.

11. The system of claim 1, wherein a surface of the first plate and a surface of the second plate have emissivity of 0.60 to 0.95.

12. The system of claim 1, wherein the first plate and the second plate are formed of a metal and have a thickness of 0.1 mm to 5 mm.

13. The system of claim 1, wherein the fluid contains at least one selected from a group including air, helium, nitrogen, and water.

14. The system of claim 1, wherein the lattices are formed of ceramic and have thermal conductivity of 0.1 W/m·K to 1.0 W/m·K.

15. The system of claim 1, wherein a length of each of the first plate and the second plate in a vertical direction is greater than a thickness of the lattice, and wherein a thickness ratio of the lattice to the vertical length of each of the first plate and the second plate is 0.2 or less.

16. The system of claim 1, wherein the unit structures are repeatedly arranged in a vertical direction.

* * * * *